UNITED STATES PATENT OFFICE.

CHARLES HORNBOSTEL, OF NEW YORK, N. Y.

PREPARING FERMENTED AND DISTILLED LIQUIDS, EXTRACTS, AND SOLUTIONS.

SPECIFICATION forming part of Letters Patent No. 508,882, dated November 14, 1893.

Application filed October 14, 1892. Serial No. 448,886. (No specimens.)

*To all whom it may concern:*

Be it known that I, CHARLES HORNBOSTEL, a citizen of the United States, residing at New York, county and State of New York, have invented certain new and useful Improvements in Preparing Fermented and Distilled Liquids, Extracts, and Solutions; and I do hereby declare that the following is a full, clear, and exact description of the invention, which will enable others skilled in the art to which it appertains to make and use the same.

My invention relates to certain transformations in the condition of the albuminous, glutinous and other nitrogenous constituents of materials, which takes place in the process of preparing fermented and distilled liquids from said materials and which said nitrogenous constituents in their altered state are known as imparting to said liquids their characteristic aroma and taste, while the starchy and saccharine yielding constituents of said materials contribute alcohol to said liquids, and to which latter constituents and their transformation my invention does not relate. For insuring good results in the manufacture of beer for example it is necessary that the nitrogenous constituents of the cereals employed be in a state in which every part of said components break up and separate during the boiling of the worts into two distinct portions, viz: into insoluble coagulated albumen, which in this altered condition becomes readily eliminated from the worts,—and into soluble albumen, which passes over into the said worts and forms part thereof and becomes the source from which the finished beverage derives its aroma and taste. In distilled beverages said soluble albuminoids become in the same manner the source of bouquet and fullness.

Heretofore malted and raw cereals have been submitted to the action of heat by kiln drying said cereals for fitting the nitrogenous constituents of said cereals to better separate into said soluble and insoluble portions during the boiling of beer worts and during the distillation of fermented liquids. Fermentation engendering lactic acid has been resorted to, rendering said nitrogenous constituents soluble in the manufacture of what is known as "sour mash whisky." Heat has also been made the agent for neutralizing in wine and beer not fully oxidized nitrogenous constituents and for thus increasing the keeping property of said wine and beer, which is known as "Pasteur's process."

The object of my invention consists in separating said nitrogenous constituents more completely into said soluble and insoluble portions than this has been accomplished heretofore and causing thereby that more soluble albuminoids and their derivatives be derived from said nitrogenous constituents and become components of fermented and distilled beverages. I also aim in my invention at increasing the keeping property of fermented beveragess and add to their palatableness and to that of distilled beverages.

To carry my invention into effect and to accomplish said objects of my invention, I subject said solutions, liquids, extracts and substances, containing nitrogenous and oxidizable matter, to the direct action of an oxidizing agent hereinafter described.

I have found, that an agent, heretofore not employed in the preparation of distilled and fermented liquids and of extracts and solutions, acts on the said nitrogenous constituents of said liquids, extracts and solutions the same as active oxygen or ozone and that said agent causes the oxidation of said constituents and their transformation as hereinbefore described and also exerts a bleaching effect on the coloring matter contained in many vegetable solutions and extracts. Said agent consists in an earthy composition known in the arts under various names, viz: as diatomaceous earth, as fossil meal, as infusorial earth and as kiesel guhr, and as having its origin in the silicious shells of diatomaceæ and as a mass of infinitesimal small particles of varying dimensions and forms, which constitute a silicate.

In carrying my invention into effect, I first prepare said earthy composition, so as to render it fit for the purposes of my invention and to this end I extract from it the moisture, of which it holds more or less large portions according to the conditions under which found in nature, by forcing slightly heated air through and over a mass of said earthy composition, or air which is possessed of a more constant and greater drying efficiency than the atmospheric air; I have found however that the application of a higher heat for extracting the moisture from said earthy composition, changes its character in such a manner as to impair its utility for the purposes of my invention. I reduce said earthy composition to a fine powdered mass and separate therefrom by well known means of sifting and milling any objects of an organic nature and impurities generally, which are frequently found intermingled with said earthy composition and which interferes with its utility for the purposes of my invention, as said impurities have frequently undergone decay to an extent to impart to said earthy composition an obnoxious odor, which is very difficult to remove. For insuring good results in carrying out my invention I prefer to use a kiesel guhr, which is free from all impurities, which lend an odor to it and I am guided in selecting said kiesel guhr by its natural color and that which is the nearest to white is the best adapted for my purpose. Said earthy composition is uniformly found in combination and in but little varying proportions with lime, potash and alumina and also with greatly varying admixtures of iron and sulphur, which said combinations with lime, potash and alumina do not interfere with the purposes of my invention, while I prefer to use a kiesel guhr which is as free from said iron and sulphur as I can obtain it. Said earthy composition may be readily recognized and thus distinguished from any other earthy matter or substances by testing for example its oxidizing effect on the aromatic properties of distilled and fermented liquids, on the aldehyde in distilled liquors, on the suspended albuminous matter in beer, which coagulates and precipitates and its bleaching effect on the coloring matter in decoctions of logwood and in red wine. I apply said earthy composition in a finely powdered and dry state in the following manner and proportions, viz: In the preparation of brewers' and distillers' worts, I add during the mashing process at the rate of from one to five pounds of said earthy composition for each hundred pounds of solid and dry saccharifiable materials employed. I may intermingle said proportions of said earthy composition with said materials separately and before they are added to the mash. I add at the rate of from five to ten pounds of said earthy composition for each thousand gallons of worts, while these are being boiled together with hops in the preparation of beer, or while said worts, known to the distiller as beer, undergo distillation. The oxidizing effect of said additions is then made apparent by the absence in the resulting brewers' worts of a certain vegetable acidity and rawness, which ordinarily predominates, also in a much increased coagulation of the albumen, while the hops have contributed an increase in aromatic matter; the distilled product tastes cleaner and fuller, without showing the ordinarily predominating rank fousel odor and acrid taste. In preparing wine and cider and similar fermented liquids, I add to the extracted juice before fermentation sets in, from two to five pounds of said earthy composition for each hundred gallons of juice; I may add corresponding proportions of said earthy composition to the crushed grapes, apples or other fruits previous to the extraction of said juice. After the main fermentation is finished and when the fermented beer, wine or cider has been drawn off from the lees in the fermenting cask, I add to the cleared liquid, which is now placed in another cask for finishing its secondary fermentation, from one to three pounds of said earthy composition for each hundred gallons for further rendering insoluble and precipitating nitrogeneous matter and mainly yeast particles, which may have remained in suspension and in a semi-exhausted state in said liquids; the oxidizing effect, which has taken place is made apparent by an advanced state of maturity, which to reach would otherwise require a much longer space of time. Some fermented liquids may require repeated periodical treatments with said earthy composition, which is then applied each time to the cleared liquids after these have been drawn off from the lees.

In subduing in distilled liquors the acrid and burning taste due to aldehyde, I employ comparatively but small portions of said earthy composition, as I have found that the aromatic bodies in distilled spirits are very sensitive toward oxidation from said source. I use from four to eight ounces of said earthy composition for one hundred gallons of spirits or whisky; however as the nature of these varies considerably according to their mode of manufacture and materials employed, said proportions vary accordingly, but may be easily determined by first adding a minimum proportion and by increasing this until the proper proportion may have been reached and for determining said proper proportion, the operator is assisted by the instantaneousness of the said oxidizing effect on said aromatic bodies and acrid taste; an excess of said earthy composition affects said aromatic bodies in distilled spirits unfavorably and has to be guarded against. In subjecting said materials and solutions to the action of said kiesel guhr as hereinbefore described, the contact which takes place by thoroughly intermingling said kiesel guhr with said materials and solutions in carrying out my invention is sufficient for causing the desired oxidizing effect; during said contact and on exerting said oxidizing effect said kiesel guhr as a solid matter undergoes no change and is easily eliminated from solutions by filtration or precipitation.

I am aware that it is not new to apply atmospheric oxygen and ozonized air and to use charcoal for purifying distilled spirits. The distinctive and characteristic feature of my invention is that it consists in a new source for obtaining an oxidizing effect from and that I obtain by means of my invention new and useful results from said new source, which were not obtainable from sources heretofore known or in use. I am not aware that it has been made known heretofore that said kiesel guhr is possessed of the property of producing the new and useful results hereinbefore described, nor that said kiesel guhr has been applied heretofore to the purposes hereinbefore described.

Having fully described my invention, what I desire to claim, and secure by Letters Patent, is—

In the manufacture of fermented and distilled liquids and of extracts the process of subjecting to the action of kiesel guhr the materials from which said liquids and extracts are prepared for the purpose of perfecting and facilitating the conversion of said materials into said liquids and extracts, all substantially as described.

CHARLES HORNBOSTEL.

Witnesses:
WILLIAM H. LUSK,
STEPHEN W. WHEELER.